(12) United States Patent
Eriksson et al.

(10) Patent No.: US 12,031,223 B2
(45) Date of Patent: Jul. 9, 2024

(54) STRIPPING OF METAL FROM CATHODES

(71) Applicants: Glencore Technology Pty Limited, Brisbane (AU); MESCO Inc., Tokyo (JP)

(72) Inventors: Per Ola Eriksson, Stuart (AU); Noel Douglas Kimlin, Stuart (AU); Naofumi Kimura, Tokyo (JP)

(73) Assignees: Glencore Technology Pty Limited, Brisbane (AU); MESCO Inc., Tokyo (JP)

( * ) Notice: Subject to any disclaimer, the term of this patent is extended or adjusted under 35 U.S.C. 154(b) by 726 days.

(21) Appl. No.: 17/265,001

(22) PCT Filed: Aug. 20, 2019

(86) PCT No.: PCT/AU2019/050876
§ 371 (c)(1),
(2) Date: Feb. 1, 2021

(87) PCT Pub. No.: WO2020/037362
PCT Pub. Date: Feb. 27, 2020

(65) Prior Publication Data
US 2021/0324529 A1    Oct. 21, 2021

(30) Foreign Application Priority Data

Aug. 21, 2018  (AU) ................. 2018903066
Sep. 14, 2018  (AU) ................. 2018903463

(51) Int. Cl.
*C25C 7/08* (2006.01)
*B25J 9/00* (2006.01)

(52) U.S. Cl.
CPC ............... *C25C 7/08* (2013.01); *B25J 9/0093* (2013.01)

(58) Field of Classification Search
CPC ................. C25C 7/08; B25J 9/0093
(Continued)

(56) References Cited

U.S. PATENT DOCUMENTS 3,689,396 A   9/1972   Casagrande et al.
3,847,779 A   11/1974  Sekine et al.
(Continued)

FOREIGN PATENT DOCUMENTS

AU   625243 B2   7/1992
AU   768314 B2   12/2003
(Continued)

OTHER PUBLICATIONS

Keller Tippmann, Martin Eric; Office Action for Chilean Patent Application No. 202100429; Jan. 12, 2022; 60 pages.
(Continued)

*Primary Examiner* — James D Sells
(74) *Attorney, Agent, or Firm* — Bradley Arant Boult Cummings LLP

(57) ABSTRACT

An apparatus for stripping metal (12, 14) deposited on a cathode plate (16), comprises a first robotic arm (46) carrying a first stripping apparatus (40), the first stripping apparatus having a first gripping apparatus (62, 63) to grip the cathode plate such that the first robotic arm operates to lift the cathode plate out of the stripping station following stripping of the metal sheets from the cathode plate. A second robotic arm (48) carrying a second stripping apparatus (42) is located on a second side of the cathode plate, the second stripping apparatus having a second gripping apparatus (76, 77) for gripping one or both of the first sheet of metal (12) and the second sheet of metal (14). The second robotic arm can be operated to move the first sheet of metal and the second sheet of metal to a metal storage region following stripping from the cathode plate (16). The metal is (Continued)

stripped from the cathode plate without breaking the bridge of metal that interconnects the first sheet of metal and the second sheet of metal.

36 Claims, 11 Drawing Sheets

(58) Field of Classification Search
USPC .......................................................... 156/701
See application file for complete search history.

(56) References Cited

U.S. PATENT DOCUMENTS

| | | | |
|---|---|---|---|
| 4,840,710 A | 6/1989 | Middlin et al. | |
| 8,607,837 B2 * | 12/2013 | Ruddell | C25C 7/08 |
| | | | 156/759 |
| 2007/0144894 A1 | 6/2007 | Salamanca | |
| 2007/0152616 A1 | 7/2007 | Salamanca | |

FOREIGN PATENT DOCUMENTS

| | | |
|---|---|---|
| AU | 2010210310 B2 | 8/2013 |
| CA | 2178776 A1 | 12/1997 |
| CN | 102362011 A | 2/2012 |
| JP | 2002531697 A | 9/2002 |
| JP | 2012516943 A | 7/2012 |
| JP | 2013515849 A | 5/2013 |
| WO | WO-2005054546 A1 | 6/2005 |
| WO | WO-2010088737 A1 | 8/2010 |
| WO | WO-2014103393 A1 | 7/2017 |

OTHER PUBLICATIONS

Keller Tippmann, Martin Eric; Office Action for Chilean Patent Application No. 202100429; Apr. 28, 2022; 38 pages.
Baidak, A.A.; Office Action for Eurasian Patent Application No. 202190443; Jan. 19, 2022; 2 pages.
Ritter, Thomas; Office Action for European Patent Application No. 19852073.6; May 5, 2022; 7 pages.
Gupta, Santosh; International Search Report; PCT/AU2019/050876; dated Nov. 25, 2019; 5 pages.
Canadian Intellectual Property Office, Canadian Patent Application No. 3,108,709, Office Action dated Jul. 18, 2023, 4 pages.
China National Intellectual Property Administration, Chinese Patent Application No. 201980069217.9, Office Action dated Dec. 23, 2023, 13 pages.
Intellectual Property Office of the Philippines, Filipino Patent Application No. Jan. 2021/550336, "Subsequent Substantive Examination Report," dated Aug. 16, 2023, 4 pages.
Intellectual Property Office of Vietnam, Vietnamese Patent Application No. 1-2021-00882, Office Action dated Aug. 29, 2023, 4 pages.
Japan Patent Office, Japanese Patent Application No. 2021-506659, Office Action dated Sep. 12, 2023, 6 pages.
Thailand Department of Intellectual Property, Thai Patent Application No. 2101000824, Office Action dated Jun. 23, 2023, 4 pages.

* cited by examiner

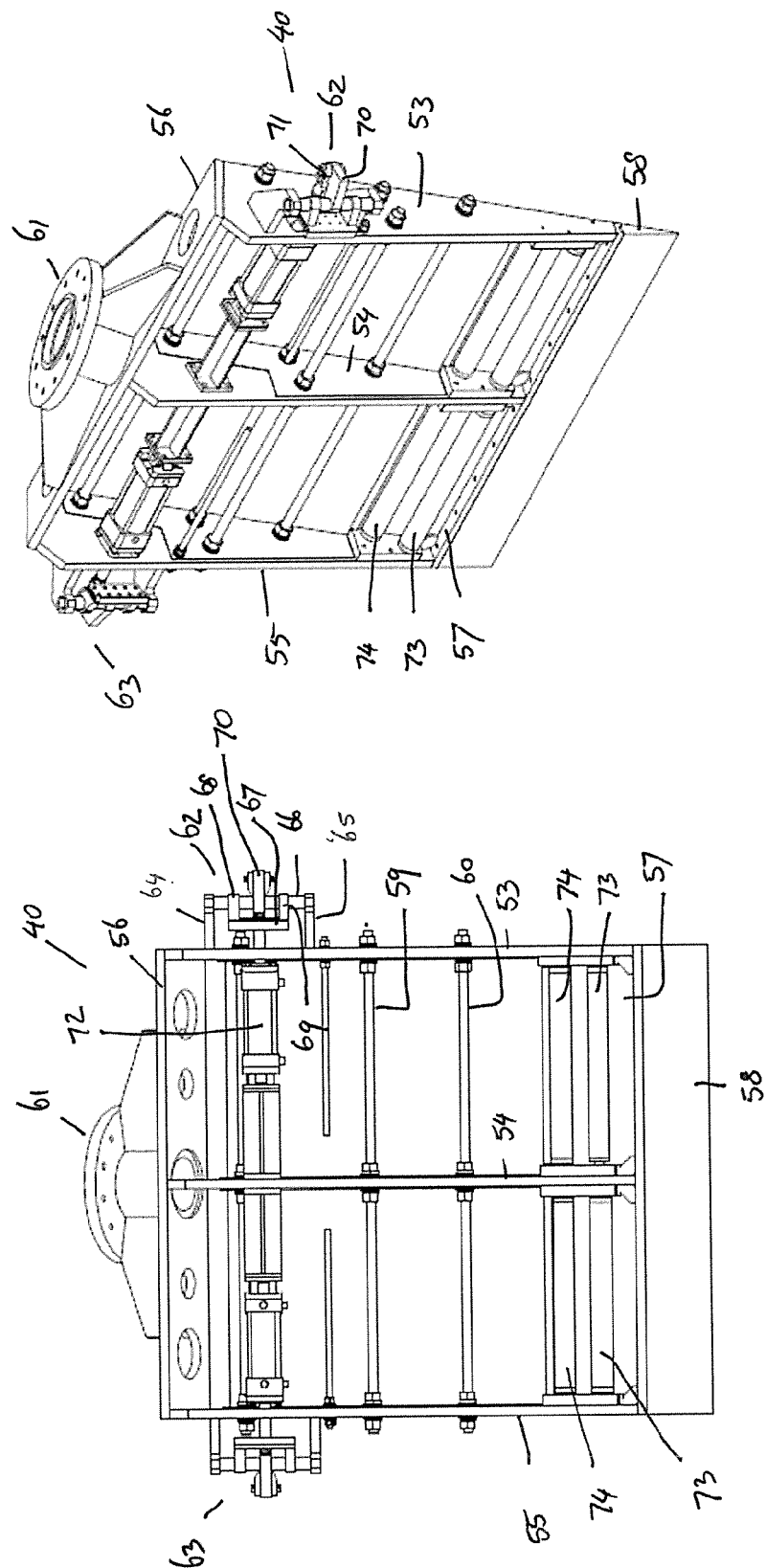

STRIPPING OF METAL FROM CATHODES

TECHNICAL FIELD

The present invention relates to a method for stripping metal from a cathode plate. The present invention also relates to an apparatus for stripping metal from a cathode plate.

BACKGROUND ART

Production of metal using electrochemical processes involves deposition of the metal on a cathode plate. For example, in the electrowinning or electrorefining of copper, copper metal is deposited on to stainless steel cathode plates. When the deposited copper metal has grown to a desired thickness, the cathode plate is removed from the electrolysis cell and the deposited metal is stripped from the cathode plate. Some workers in this field refer to the cathode plate as a cathode blade. These terms are used interchangeably.

Stripping of the deposited metal from the cathode plate is desirably conducted using a largely automated process in order to achieve high throughput in the stripping plant. For example, in U.S. Pat. No. 4,840,710, the entire contents of which are incorporated herein by cross-reference, a method for stripping electrically deposited copper from a cathode is described. In this method, the cathode is flexed by an amount exceeding the strength of the adhesion bond between the deposited metal and the cathode, but not exceeding the elastic limit of the cathode. This causes at least part of the deposited metal to separate from the cathode, leaving a gap between that part of the deposited metal and the cathode. The deposited metal is then stripped from the cathode by use of wedges that slide in between the surface of the cathode and the deposited metal. The use of wedges to strip the metal from the cathode involves the wedge moving in an up and down motion. The wedges prise the metal away from the cathode plate such that the angle between the metal and the cathode plate is typically between 15-25 degrees. Grippers are then used to grip the metal when in this position and pivot the metal around the bottom of the cathode plate to a horizontal position. The wedges are typically much smaller than the cathode in terms of height and width, which, when used in conjunction with grippers, sometimes produce a bow at the bottom of the stripped metal. U.S. Pat. No. 4,840,710 also describes the use of gas blasting to strip the deposited metal from the cathode.

The method of U.S. Pat. No. 4,840,710 has been commercially implemented in a number of copper plants around the world and this method forms part of the ISA PROCESS™ technology commercially available from the present applicant.

When metal is deposited on cathode plates, edge strips are typically placed on the vertical edges of the cathode plates in order to prevent metal being deposited along the vertical or side edges of the cathode plates. As a result, sheets of metal are deposited on either side of the cathode plate. These sheets of metal on either side of the cathode plate are not joined to each other along their vertical edges.

In some plants, the bottom edge of the cathode plates is covered in wax or fitted with bottom strips prior to deposition of metal thereon. This prevents the deposition of metal along the bottom edge of the cathode plates and, consequently, the sheets of metal that are deposited on either side of cathode plate remain separate from each other.

In other plants, the bottom edge of the cathode plates are not waxed or fitted with bottom strips prior to deposition of metal, which results in metal also being deposited along the bottom edge of the cathode plate. The cathodes may be provided with a substantially flat bottom edge (for instance if it is not desired to break the metal deposited along the bottom edge) or, alternatively, the bottom edge may be provided with notches, grooves or the like. This last-mentioned type of cathode is designed to assist in the stripping of the metal from the cathode, as described in Australian Patent No. 768314. In that case, the cathode is designed for the electro-depositing of a metal thereon. The cathode is designed with a groove on the bottom thereof, with metal being deposited thereon to form a frangible portion. The groove is shaped so that a line of weakness is formed in the metal deposited within the groove, such that separation of the two sheets of deposited metal is initiated upon the line of weakness. In these plants, the sheets of deposited metal on either side of the cathode plate are connected to each other by the metal that is deposited along the bottom edge. During stripping of cathodes in which metal is deposited along the bottom edge as well as on either side of the cathode plate, the wedges push the sheets of metal away from the sides of the cathode plate out to grippers, to an approximate angle of 15-20 degrees. The grippers then bring the copper to the horizontal position and pull it for separation.

However, if the metal that has deposited on the bottom edge of the cathode plate does not break during the initial stripping operation, it is necessary to flex the sheets upwardly and then downwardly until that metal breaks. Grippers are then used to flex the sheets of metal upwardly and downwardly until the interconnecting metal between the sheets breaks.

In our Australian patent number 2010210310, the entire contents of which are herein incorporated by cross-reference, we describe an apparatus for stripping metal from a cathode plate. The apparatus comprises stripping means adapted to be positioned between the metal and the cathode plate when separating the metal from the cathode plate, and wherein movement of the stripping means is achieved through movement of a robotic arm.

Australian patent number 2010210310 described several ways in which the metal bridge connecting the sheets of metal deposited on either side of the cathode plate could be broken so that the sheet of metal on either side of the cathode plate were separated from each other. In this manner, two separate sheets of metal were recovered from each cathode plate, with the separate sheets of metal being typically formed into a stack comprising a number of sheets of metal.

Variations of the apparatus described in Australian patent number 2010210310 have been installed in a number of locations around the world.

In some cathode stripping operations, the cathode deposits are not separated from each other during the stripping process. In other words, the bridge of metal that connects the deposited sheet of metal on one side of the cathode plate to the deposit of sheet of metal deposited on the other side of the cathode plate is not broken during stripping. Typically, following stripping, the opposed sheets of metal that are still connected via the bridge at the lower edge are folded back together after stripping. It has been found that such stripping systems are more complex and to achieve high machine throughputs (for example, around 500 cathodes per hour), two stripping stations have been required in the stripping machines.

It will be clearly understood that, if a prior art publication is referred to herein, this reference does not constitute an admission that the publication forms part of the common general knowledge in the art in Australia or in any other country.

SUMMARY OF INVENTION

The present invention is directed to a method for stripping metal from a cathode plate and to an apparatus for stripping metal from a cathode plate that aims to keep the bridge of metal connecting the sheets of deposited metal on either side of the cathode plate intact during the stripping operation, whilst providing for good throughput.

With the foregoing in view, the present invention in one form, resides broadly in a method for stripping metal deposited on a cathode plate, wherein the cathode plate has a first sheet of metal deposited on a first side and a second sheet of metal deposited on a second side, with a bridge of metal formed at a lower edge of the cathode plate interconnecting the first sheet of metal with the second sheet of metal, the method comprising:

moving a first stripping apparatus with a first robotic arm to separate the first sheet of metal from the first side of the cathode plate, moving a second stripping apparatus with a second robotic arm to separate the second sheet of metal from the second side of the cathode plate, wherein the first sheet of metal and second sheet of metal remain interconnected by the bridge of metal at the lower edge, gripping the cathode plate with a first gripping apparatus, the first gripping apparatus being associated with the first robotic arm, and operating the first robotic arm to remove the cathode plate from the stripping station and place the cathode plate into a storage region or a transport region, and moving the first sheet of metal and the second sheet of metal to a metal storage region or a metal transport region.

In one embodiment, the step of moving the first sheet of metal and the second sheet of metal to a metal storage region or a metal transport region comprises moving the first sheet of metal and the second sheet of metal to a metal storage region or a metal transport region using the second robotic arm. In one embodiment, this may comprise gripping one or both of the first sheet of metal and second sheet of metal using a second gripping apparatus associated with the second robotic arm, and operating the second robotic arm to move the first sheet of metal and the second sheet of metal to the metal storage region or the metal transport region.

In one embodiment, the second sheet of metal is held in position by side guides and a pusher pushes the first sheet of metal towards the stripping apparatus (which may be a wedge), and a second gripping apparatus associated with the second robotic arm grips the first sheet of metal and/or the second sheet of metal and the second robotic arm is operated to move the first sheet of metal and the second sheet of metal to the metal storage region or metal transport region.

In one embodiment, the second sheet of metal is gripped by second gripping apparatus associated with the second robotic arm and a pusher pushes the first sheet of metal towards the stripping apparatus (which may be a wedge) to close up a gap between the first sheet of metal and the second sheet of metal, and the second robotic arm is operated to move the first sheet of metal and the second sheet of metal to the metal storage region or metal transport region. In some embodiments, the second gripping apparatus grips the first sheet of metal once it has been pushed towards the second sheet of metal.

In one embodiment, the second robotic arm moves the first sheet of metal and the second sheet of metal to a movable support and the second gripping apparatus is actuated to let go of the first sheet of metal and the second sheet of metal, and the movable support is moved so that the first sheet of metal and the second sheet of metal are moved onto a conveyor.

The movable support may comprise a down ender having a support surface, the support surface being movable between a lower position at which the support surface at least partly located below a conveyor and an upper position at which the support surface extends upwardly above the conveyor, wherein the first metal sheet and the second metal sheet are moved by the second robotic arm to a position where first metal sheet and the second metal sheet are supported by the support surface in the upper position, the second gripping apparatus releases the metal sheets and the second robotic arm is operated to move the second gripping apparatus away from the metal sheets, and the down ender is operated so that the support surface moves to the lower position and the metal sheets come into contact with the conveyor and are transported away by the conveyor.

The method of the present invention uses one of the robotic arms to remove the cathode plate from the stripping station following stripping of the metal from the cathode plate. The other robotic arm is used to move the stripped sheets of metal to the metal transport region or the metal storage region. In this manner, very efficient utilisation of the robotic arms is achieved. Further, the capital costs associated with having a separate carrying means for removing the cathode plate from the stripping station following stripping can be avoided.

In one embodiment, the steps of separating the first sheet of metal and the second sheet of metal from the respective sides of the cathode plate comprises positioning a first stripping apparatus between the cathode plate and the first sheet of metal, positioning a second stripping apparatus between the cathode plate and second sheet of metal, the first stripping apparatus being moved by a first robotic arm and the second stripping apparatus being moved by a second robotic arm, moving the first stripping apparatus between the first sheet of metal and the cathode plate to thereby separate the first sheet of metal from the cathode plate and moving the second stripping apparatus between the second sheet of metal and the cathode plate to thereby separate the second sheet of metal from the cathode plate, wherein the first sheet of metal and second sheet of metal remain interconnected by the bridge of metal at the lower edge.

In preferred embodiments of the present invention, the cathode plates have been flexed prior to positioning in the stripping station. In this manner, a small gap may be opened up at the top between the deposited sheets of metal and the cathode plate and the stripping apparatus can then be inserted into those small gaps in the stripping station in order to complete the stripping process. The step of flexing the cathode plates to partly separate the deposited metal from the cathode plate prior to inserting the stripping apparatus between the cathode plate and the deposited sheets of metal is well known in the art.

The present invention also relates to an apparatus for stripping metal from the cathode plates.

In accordance with a second aspect, the present invention provides an apparatus for stripping metal deposited on a cathode plate, the apparatus comprising a stripping station having a support for supporting a cathode plate having a first sheet of metal deposited on a first side of the cathode plate and a second sheet of metal deposited on a second side of the cathode plate, the first sheet of metal and the second sheet of metal being interconnected by a bridge of metal deposited at a lower edge of the cathode plate, the apparatus comprising a first stripping machine located on a first side of the cathode plate, the first stripping machine comprising a first robotic arm carrying a first stripping apparatus, the first stripping machine having a first gripping apparatus associated with the first robotic arm, the first gripping apparatus adapted to grip the cathode plate such that the first robotic arm can be operated to thereby lift the cathode plate out of the stripping station following stripping of the first metal sheet and the second metal sheet from the cathode plate, a second stripping machine located on a second side of the cathode plate, the second stripping machine comprising a second robotic arm carrying a second stripping apparatus, the second stripping machine having a second gripping apparatus associated with the second robotic arm, the second gripping apparatus adapted for gripping one or both of the first sheet of metal and the second sheet of metal, wherein the second robotic arm can be operated to move the first sheet of metal and the second sheet of metal to a metal storage region or a metal transport region following stripping of the first sheet of metal and second sheet of metal from the cathode plate, the first stripping apparatus and the second stripping apparatus being operable to strip the first sheet of metal and the second sheet of metal from the cathode plate without breaking the bridge of metal that interconnects the first sheet of metal and the second sheet of metal.

The first stripping apparatus and the second stripping apparatus are typically inserted into a gap between the deposited sheets of metal and the cathode plate. The robotic arm is then operated to move the first stripping apparatus and the second stripping apparatus along a cathode plate, which effectively pushes the first sheet of deposited metal and the second sheet of deposited metal away from the cathode plate, thereby resulting in the sheet of metal being stripped from the cathode plate.

The first stripping apparatus may be connected to the first robotic arm. The second stripping apparatus may be connected to the second robotic arm. The stripping apparatus may be mounted directly to the robotic arm or they may be mounted indirectly with one or more intermediate portions between the robotic arm and the stripping apparatus.

In one embodiment, the stripping apparatus may include one or more insertion means. The insertion means may be adapted for insertion between the metal and the cathode plate in order to separate at least a portion of the metal from the cathode plate. Any suitable insertion means may be provided, such as, but not limited to, one or more pincers, knives, chisels, wedges or the like, or any combination thereof. In some embodiments complementary means may be provided, the complementary means adapted to be positioned adjacent the external surface of the metal such that the insertion means and the complementary means form, for instance, a pair of pincers adapted to grip at least a portion of the metal.

In some embodiments of the invention, one or more insertion means are present. In this embodiment of the invention, the insertion means are preferably spaced apart from one another such that the insertion means may be inserted into the gap between the metal and the cathode plate at points along at least a portion of the width of the cathode plate in order to ensure that the entire width of the metal is separated from the cathode plate.

In some embodiments of the invention, the stripping apparatus comprises stripping means and the shape of the stripping means may be such that driving the stripping means between the metal and the cathode plate is sufficient to result in the stripping of the metal from the cathode plate. For instance, the stripping means may comprise a wedge-shaped portion, wherein the wedge-shaped portion is driven point-first between the metal and the cathode plate. As the wedge-shaped portion is driven along the metal, the diverging sides of the wedge-shaped portion result in the stripping of the metal from the cathode plate. In embodiments of the invention in which a wedge-shaped portion is used, it is preferred that the tip of the wedge-shaped portion is driven to the bottom of the cathode plate.

In a preferred embodiment of the invention, the dimensions of the wedge-shaped portion are such that the only a relatively small angle between the cathode and the metal sheet is created, even when the wedge-shaped portion is driven to the bottom of the cathode plate. In a preferred embodiment of the invention, the angle between the metal sheet and the cathode plate is no more than 20°, more preferably no more than 15°, and most preferably between about 10° and 12° when the wedge-shaped portion is driven to the bottom of the cathode plate. In a preferred embodiment of the invention, the relatively low angle between the metal sheet and the cathode plate is achieved by providing the wedge-shaped portion with a relatively low angle between the sides of the wedge-shaped portion that converge at the tip of the wedge. Preferably the angle between the sides of the wedge-shaped portion is no more than 20°, more preferably no more than 15°, and most preferably between about 10° and 12°.

By maintaining a relatively low angle between the cathode plate and the metal during stripping (preferably by providing a wedge-shaped portion with a relatively low angle between the sides that converge at the tip of the wedge), outward bending or flexing of the metal (particularly above the interconnecting metal between the metal sheets) may be reduced or prevented.

Further, it is preferred that the dimensions of the wedge-shaped portion are such that the height of the wedge-shaped portion is approximately equal to the height of the metal sheet and the width of the wedge-shaped portion is approximately equal to the width of the cathode plate. In this way, contact between the metal and the wedge-shaped portion may be maximised, and the stripping process may be performed with high efficiency.

In some embodiments of the invention, a plurality of wedge-shaped portions may be provided. For instance, in one preferred embodiment of the invention, four wedge-shaped portions may be provided. Preferably, when multiple wedge-shaped portions are present, the wedge-shaped portions are spaced approximately equidistantly from one another across the width of the cathode plate.

Preferably, the stripping means are driven substantially vertically downwards into the gap between the metal and the cathode plate. While in some embodiments of the invention, driving the wedge-shaped portion into the gap between the metal and the cathode plate may be sufficient to cause the separation of the metal from the cathode plate, in other embodiments of the invention, the stripping means may be provided with one or more rollers to reduce friction as the stripping means is driven into the gap between the metal and the cathode plate. In one embodiment of the invention, the stripping means comprises a pair of rollers. In this embodiment of the invention, it is preferred that one of said pair of rollers is adapted to contact the internal face of the metal, while the second of said pair of roller is adapted to contact the surface of the cathode plate. In some embodiments of the invention, the one or more rollers may be adapted to be located at or adjacent a vertical edge of the metal when the apparatus is in use. In a preferred embodiment of the invention, one or more rollers are adapted to be located at each of the vertical edges of the metal. In this embodiment of the invention, the wedge-shaped portion is located intermediate the one or more rollers adapted to be located at each of the vertical edges of the metal.

In another embodiment, the stripping means comprises at least one roller that contacts the cathode plate and at least one projection that contacts the metal. The projection may comprise a wedge-shaped projection. The projection may project below the at least one roller. In this embodiment, the at least one roller contacts the cathode plate, thereby minimising damage to the cathode plate. This is desirable as the cathode plates are re-used many times.

Other stripping means, such as those described in Australian patent number 2010210310, may also be used in the present invention.

Any suitable robotic arm may be used in the present invention. However, it is preferred that the robotic arm is of a suitable construction so as to be capable of performing the movements (e.g. bending and/or pivoting) that are required to strip the metal from the cathode and to move the cathode plate or the stripped metal sheets. Thus, it is preferred that the robotic arm is provided with one or more hinged portions that allow the robotic arm to make the necessary movements.

The robotic arm may be powered using any suitable source of energy, such as, but not limited to, batteries, mains power, generators, solar power or the like, or any combination thereof.

In one embodiment, each robotic arm may comprise a first arm having a second arm pivotally connected thereto. The stripping apparatus may be pivotally connected to the second arm of the robotic arm. The first arm of the robotic arm may be pivotally connected to a base. The base may be rotatable about a vertical axis. The first robotic arm may be pivotally connected, such as about a horizontal axis, to the base. The second robotic arm may be pivotally connected, such as about a horizontal axis, to the first arm. The stripping apparatus may be pivotally connected, such as about a horizontal axis, to the second arm. The robotic arm may be arranged such that the distal end of the second arm can move upwardly and downwardly and inwardly and outwardly relative to the base. The robotic arm may be controlled by a programmable controller. The movement of the robotic arm may be programmed into the programmable controller. The first robotic arm may be programmed to complete a set of first movements. The second robotic arm may be programmed to complete a second set of movements. The robotic arms may be controlled in such that the first stripping apparatus and the second stripping apparatus move simultaneously with each other during stripping of the sheets of metal from the cathode plate.

The stripping means may be formed integrally with the robotic arm, or the robotic arm may be adapted to allow the stripping means to be attached thereto. The stripping means may be attached to the robotic arm using any suitable technique. Typically, the stripping means is likely to be connected to the robotic arm by bolts, nuts or the like.

The first gripping apparatus may comprise any suitable gripping apparatus that can grip and hold the cathode plate. The gripping apparatus may comprise one or more clamps, suction devices, clips or the like, or any combination thereof. In some embodiments of the invention, the gripping apparatus comprises one or more clamps and the one or more clamps may be actuated electrically, hydraulically, pneumatically, or any combination thereof.

The first gripping apparatus may be mounted to a frame or a support that forms part of the first stripping apparatus.

The first gripping apparatus may comprise at least one clamp located at one side of the first stripping apparatus and at least one clamp located at an opposite side of the first stripping apparatus. Suitably, the first gripping apparatus grips the cathode plates at both side edges of the cathode plate to thereby securely hold the cathode plate during movement of the cathode plate out of the stripping station.

The second gripping apparatus may comprise any suitable gripping apparatus that can grip and hold the sheet or sheets of metal. The second gripping apparatus may comprise one or more clamps, suction devices, clips or the like, or any combination thereof. In some embodiments of the invention, the second gripping apparatus comprises one or more clamps and the one or more clamps may be actuated electrically, hydraulically, pneumatically, or any combination thereof.

The second gripping apparatus may comprise at least one clamp located at one side of the second stripping apparatus and at least one clamp located at an opposite side of the second stripping apparatus. Suitably, the second gripping apparatus grips one or both of the sheets of metal at both side edges of the sheets of metal to thereby securely hold the sheets of metal during movement of the sheets of metal out of the stripping station. In one embodiment, a first set of clamps is provided for holding the first sheet of metal and a second set of clamps is provided for holding the second sheet of metal.

The second gripping apparatus may be mounted to a frame or a support that forms part of the second stripping apparatus.

In one embodiment, the grippers associated with the first robotic armare used to grip the edges of the cathode plate and lift it out of the copper envelope (deposited copper). Those grippers may have a smooth gripping surface to avoid scratching or other damage to the cathode plate. The gripper associated with the second robotic armgrip the enveloped copper (deposited copper). In some embodiments, there are two grippers on each side of the stripping wedge (opposite each other) so both copper sheets are secured for lifting. The primary grippers grips the copper when the downward stripping action has been completed. The secondary grippers on the opposite side waits for the robotic arm No 1 to remove the cathode plate from the inside of the envelope. A pushing device is pushing the secondary copper sheet up against the wedge so the secondary grippers can grip. The copper grippers have a similar design to the original robot stripping machine as described in our Australian patent number 2010210310.

In all aspects of the present invention, a flexing station, which flexes the cathodes prior to stripping of the metal sheets from the cathodes, will be provided. The flexing station flexes the cathodes and breaks the adhesion bond between the cathode and at least part of the metal. This may be achieved, for example, in accordance with the method described in U.S. Pat. No. 4,840,710, or by using a stripping element that is turnably movable in the vertical direction of the cathode as described in PCT/FI2004/000719 (WO 2005/054546 A1). Any other flexing operation known to the person skilled in the art or described in the literature may also be used to form the gaps.

In order to maintain the gap between the cathode plate and the metal, one or more wedges may be inserted between the metal and the cathode plate. An example in this regard is given in FIGS. 12 and 13 of Australian patent number 625243. Alternatively, one or more arms may be inserted between the metal and the cathode plate and the arms pulled away slightly from the cathode plate to maintain the gap between the metal and the cathode plate. Alternatively, one or more arms may be inserted between the metal and the cathode plate and push the metal towards a bar to create a small outward bend in the copper sheet. This prevents the copper sheet to fall back against the cathode blade.

The present invention may be used in both the electrowinning and electro-refining plants.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

In FIGS. 1 to 14, the robotic arms to which the stripping apparatus is attached have been removed for clarity;

In FIG. 15, the robotic arms are shown;

FIGS. 16 to 18 show a stripping apparatus that can be used to strip deposited metal from a cathode plate and move the cathode plate out of the stripping station.

DESCRIPTION OF EMBODIMENTS

Figure 2:
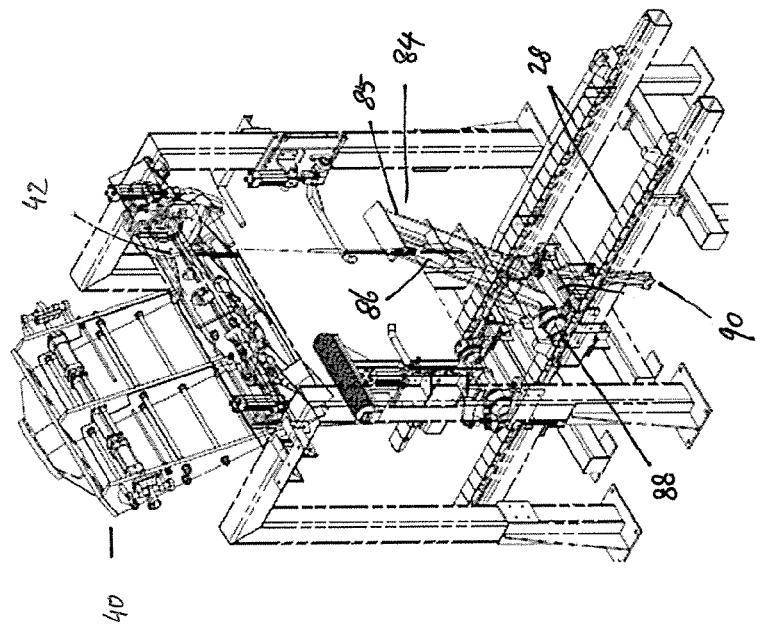
FIGS. 1 to 14 show side views and perspective views of the various steps involved in stripping deposited metal from cathode plates in accordance with one embodiment of the present invention.

It will be appreciated that the drawings have been provided for the purpose of illustrating preferred embodiments of the present invention. Therefore, the skilled person will understand that the present invention should not be considered to be limited solely to the features as shown in the drawings.

Figure 15:
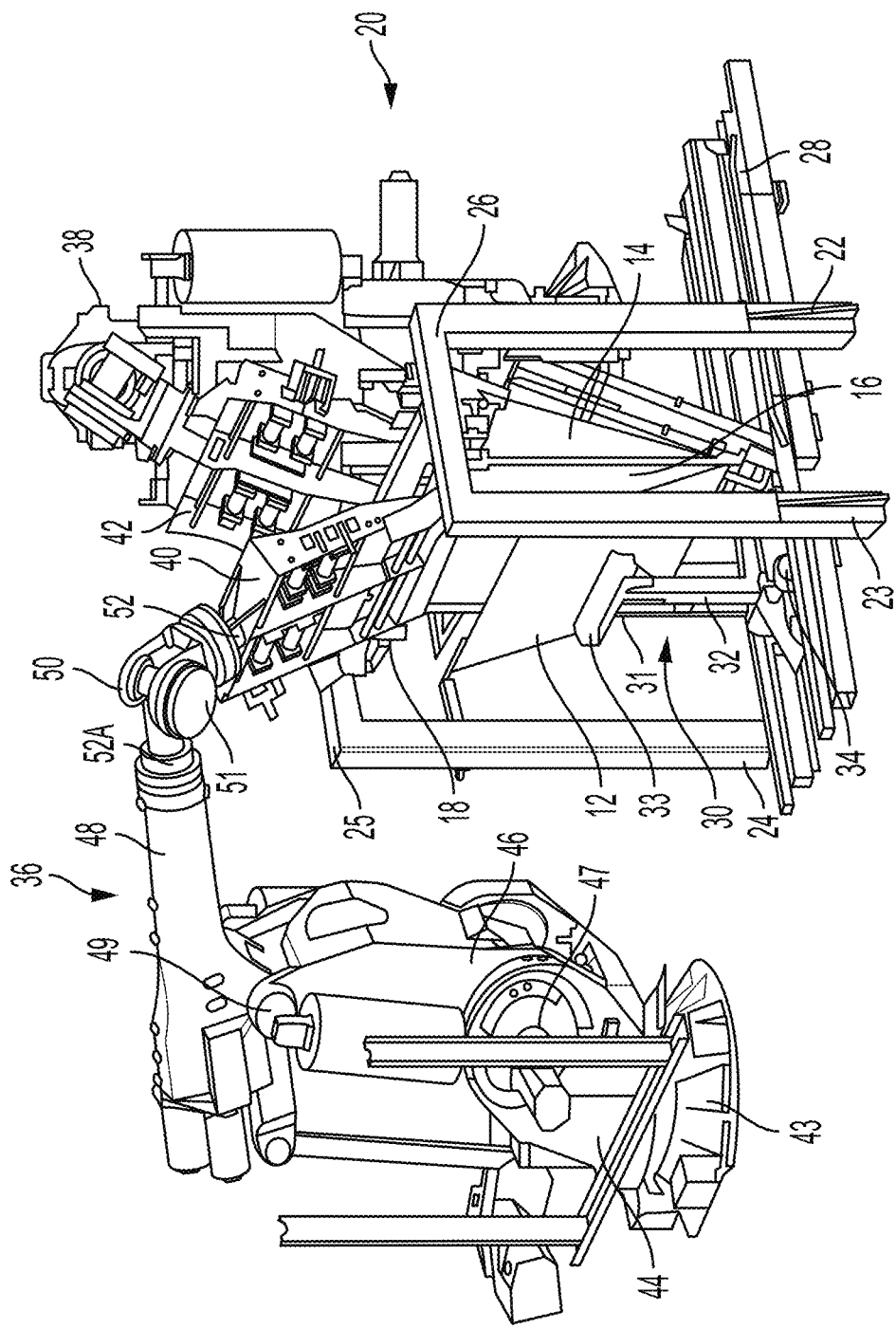
FIG. 15 shows a perspective view of apparatus in accordance with the present invention operating the step of stripping the deposited metal from the cathode plate.

Turning initially to FIG. 15, which shows an apparatus suitable for use in the method of the present invention, it can be seen that sheets of deposited metal 12, 14 are removed from a cathode plate 16 upon which the sheets of metal been deposited during an electrowinning or an electrodeposition process. The cathode plate 16 typically comprises a stainless steel plate connected to a hanger bar 18. The cathode plate is of conventional construction and need not be described further.

The deposited metal 12, 14 is removed from the cathode plate in a stripping station 20. Stripping station 20 includes a support frame comprising 4 uprights, 3 of which are shown at 22, 23, 24 and upper horizontal members 25, 26. The support frame carries a cathode plate support (obscured in FIG. 15) which typically guides the hanger bar of the cathode plate such that the cathode plate 16 extends in a generally vertical direction. The guides are mounted to the frame along the traverse conveyor and keep the cathode upright during travel on the conveyor. It also has a cathode lifting device, in this case operated by a hydraulic cylinder, that lifts the cathode plate during the stripping operation. Again, the stripping station is of generally conventional construction and will be well understood by a person skilled in the art.

A chain conveyor 28 is located underneath the stripping station. A pusher 30 is located to one side of the cathode plate. Pusher 30 comprises two uprights 31, 32 and a horizontal contact member 33. The lower end of the uprights 31, 32 are pivotally mounted about an axle 34 and an actuator 35 is used to pivot the pusher to the right from the position shown in FIG. 15 so that the pusher comes into contact with one of the sheets of deposited metal and moves that sheet of deposited metal towards the second stripping apparatus (and the other sheet of deposited metal that was deposited on the cathode plate. The actuator can also move the pusher back up to the position shown in FIG. 15.

The stripping station also includes a down ender (obscured in FIG. 15) located on the opposite side of the cathode plate 16 to the pusher 30. Construction and operation of the down ender will be described in further detail hereunder.

The first robot 36 is positioned to one side of the stripping station. A second robot 38 is positioned to the other side of the stripping station. First robot 36 is partially obscured in FIG. 15. First robot 36 carries a first stripping apparatus 40 and second robot 38 carries a second stripping apparatus 42. These described in further detail hereunder.

The first robot 36 comprises a base 43. The base 43 is fixed in positioned to the floor. The base 43 carries a robot base unit 44. Robot base unit 44 can rotate about a vertical axis. The robot base unit 44 carries a first robot arm 46. First robot arm 46 is mounted to the robot base unit 44 about axle or pivot pin 47. Axle or pivot pin 47 allows the first robot arm to rotate about a horizontal axis. A second robot arm 48 is mounted to the distal end of the first robot arm 46 at axle or pivot pin 49. Again, axle pivot pin 49 allows the second robot arm to rotate about a horizontal axis. The distal end of the second robot arm 48 is fitted with a universal joint 50 and the first stripping apparatus 40 is mounted to the universal joint 50. Universal joint 50 includes a horizontal axis 51 and a vertical axis 52 and a further axis 52A that is generally coincident with the longitudinal axis of the arm 48. By virtue of the construction of the second robot arm 38, the second stripping apparatus 42 has a wide range of movements. It can move horizontally, vertically, as well as rotatably about horizontal and vertical axes. It will be appreciated that other robots of different design may also be used in the present invention.

The first robot 46 and the second robot 48 are suitably of conventional design. Movement of the robots is controlled by appropriate controllers and actuators built into the robots. Again, these may be conventional and need not be described further.

Figure 18:
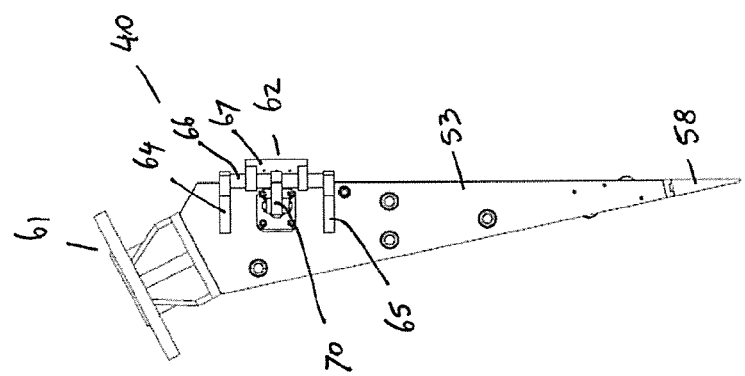

FIGS. 16, 17 and 18 show a front view, a perspective view and a side view, respectively, of the first stripping apparatus 40. The first stripping apparatus 40 comprises a frame having vertical members 53, 54, 55, a top member 56 and a bottom member 57. Bottom member 57 either has a wedge 58 integrally formed therewith or attached thereto. A number of crossmembers, some of which are shown at 59 and 60, are bolted or otherwise connected between adjacent vertical members to provide additional strength to the frame.

The top member 56 has a mount 61 attached thereto. Mount 61 enables the first stripping apparatus to be mounted to the first robot arm. The mount 61 includes a short cylinder welded to the top member 56, the short cylinder having a flange attached thereto, and a number of gusset plates welded to the flange and the top member to provide additional strength. Other designs for the mount may also be used.

The first stripping apparatus 40 also has two gripping means in the form of clamps 62, 63 mounted to oppose sides of the frame. The clamps 62, 63 are essentially identical to each other. Clamp 62 includes two ears 64, 65 that are welded or otherwise joined to the side plate 53. These ears support a pin 66. A rotatable clamping plate 67 is mounted via short arms 68, 69 to the pin 66. An eccentric arm 70 is mounted for rotation about axis 71. A drive, such as a hydraulic cylinder or a pneumatic cylinder 72 can be extended and retracted to move the eccentric arm 70 about axis 71 which, in turn, causes the pin 66 to rotate which also causes the rotatable clamping plate 67 to rotate. In this manner, the clamping plate can be selectively opened and closed.

Clamp 63 is of essentially identical construction. Other drive arrangements may replace the hydraulic cylinder or pneumatic cylinder 72. As best shown in FIG. 18, clamp 62 extends beyond the inner periphery of side member 53. In this way, when the clamp is actuated, the clamping plate 67 can move around an edge of the cathode plate 16 so that the clamping plate 67 can clamp the cathode plate 16 to the first stripping apparatus 40. Clamp 63 operates in a similar manner to clamp the cathode plate 16 to the first stripping apparatus 40.

The first stripping apparatus 40 also includes a plurality of rollers, some of which are numbered at 73, 74. As can be seen from FIG. 17, rollers 73 are offset from rollers 74. In use, one of the rollers 73 or 74 can contact and roll on the surface of the cathode plate or the deposited metal and the other of the rollers 73, 74 can contact and roll along the face of the deposited metal sheet. In this manner, possible damage to the cathode plate and the deposited metal sheet that may be caused by movement of the first stripping apparatus along the cathode plate and the first metal sheet can be minimised. The rollers also support the wedge during the downward stripping operation and reduce friction between wedge, copper deposit and cathode plate during travel.

Figure 19:
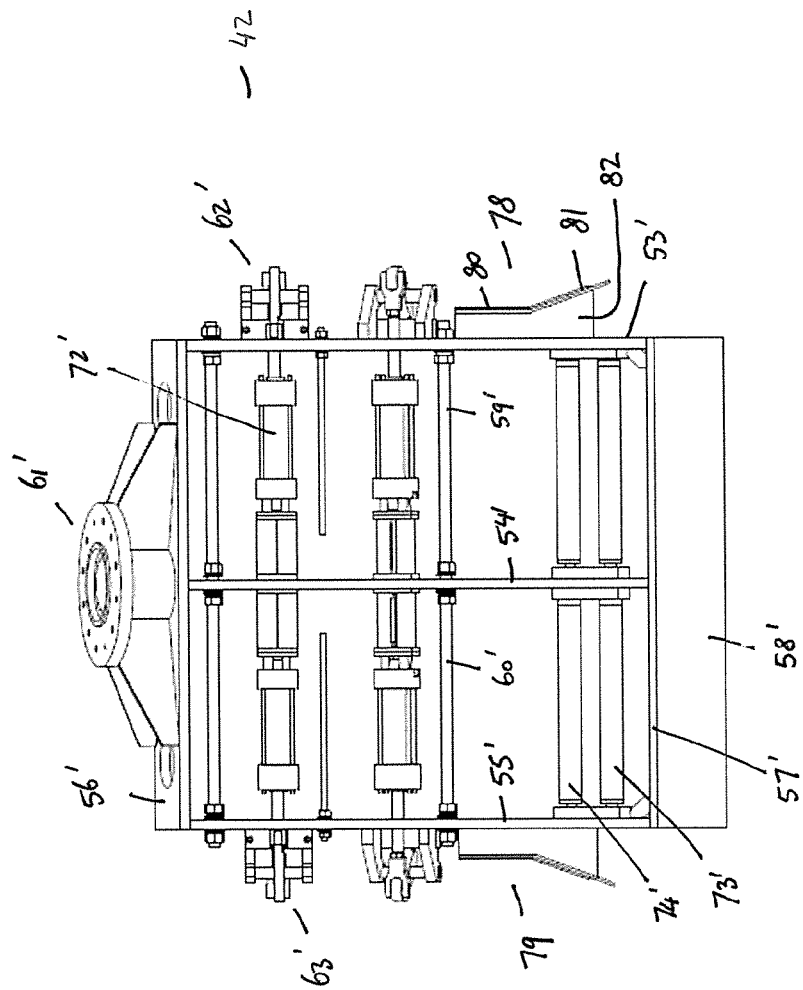
FIGS. 19 to 21 show a stripping apparatus that can be used to strip deposited metal from a cathode plate and move the stripped metal deposit out of the stripping station.
Figure 21:
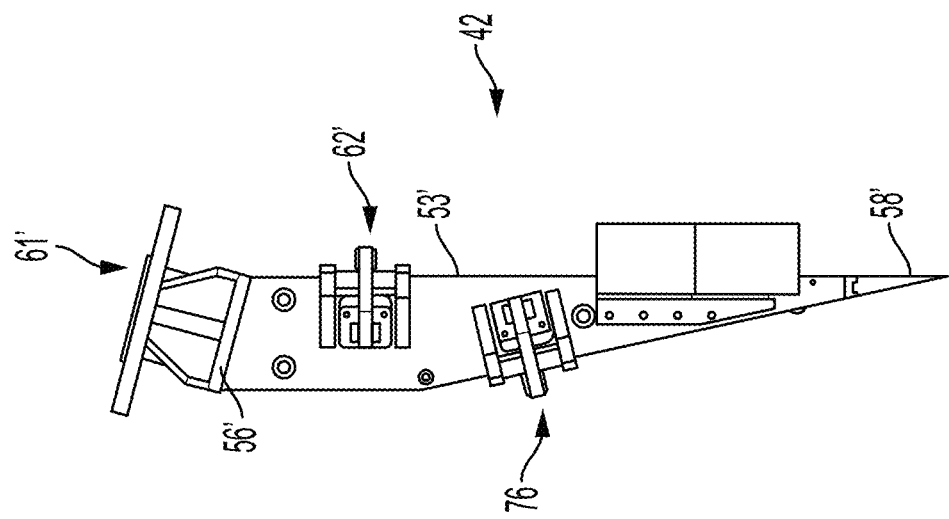
Figure 20:
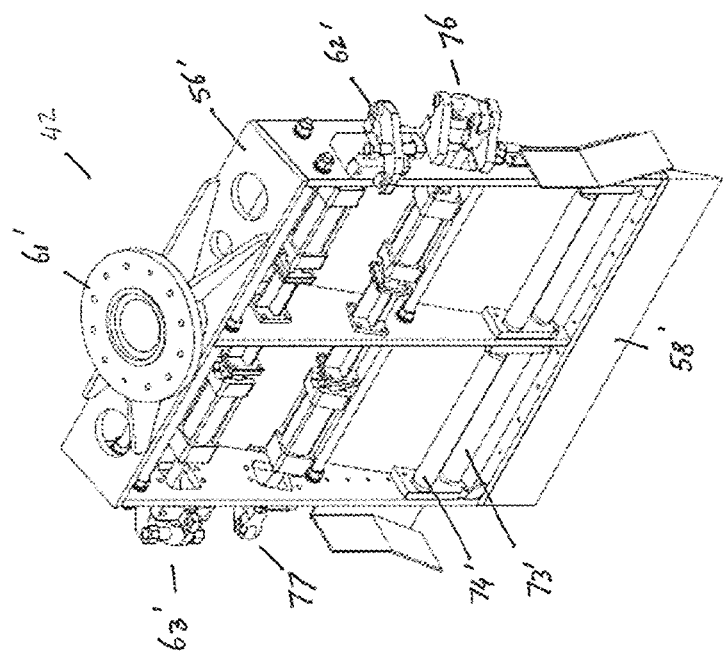

FIGS. 19, 20 and 21 show a front view, perspective view and side view, respectively, of a second stripping apparatus 42. The second stripping apparatus 42 has a number of features in common with the first stripping apparatus. For convenience, where the second stripping apparatus 42 has features in common with the first stripping apparatus 40, the same reference numerals used to denote those features in relation to the first stripping apparatus 40 will be used to denote the same features in FIGS. 19 to 21, but with the addition of a'. For example, the wedge 58 of the first stripping apparatus 40 corresponds to the wedge 58' in the second stripping apparatus 42. These features need not be described further.

Second stripping apparatus 42 differs from first stripping apparatus 40 in that second stripping apparatus 42 includes a second set of clamps 76, 77. The second set of clamps 76, 77 may be of essentially identical construction with essentially identical drive arrangements to the clamps 62, 63. However, as can be seen from FIG. 21, clamps 62' and 63' have clamping plates that can extend past the outer periphery of the second stripping apparatus 42 whereas clamps 76, 77 have clamping plates that extend past the inner periphery of the second stripping apparatus 42. In this manner, the clamps 76, 77 can clamp onto a sheet of deposited metal that has been stripped from the cathode plate and is located adjacent to the inner periphery of the second clamping apparatus 42 (this corresponds to the sheet of deposited metal that is removed from the cathode plate on the side of the cathode plate along which the first stripping apparatus moves), whilst the clamps 62', 63' can clamp onto a sheet of deposited metal that has been stripped from the cathode plate by the second stripping apparatus (this corresponds to the sheet of deposited metal that is removed from the cathode plate on the side of the cathode plate along which the second stripping apparatus moves).

The second stripping apparatus 42 also includes side guides 78, 79 that are mounted to respective side members 53', 54' of the second stripping apparatus 42. The guide 78 comprises an angled guide plate having a first section 80 and an outwardly angled second section 81. The guide 78 is mounted to or formed with a side plate 82 that is welded to the side member 53'. Guide 79 is of essentially similar construction. The guides assist in holding the second sheet of metal 14 in position by the side guides and the pusher pushes the first sheet of metal towards the stripping apparatus The guides prevent titling of the cathodes during the stripping operation, which could otherwise result in the cathode deposits moving out of reach of the clamps/grippers.

As mentioned above, first stripping apparatus 40 is mounted to the robotic arm of the first robot 36 and second stripping apparatus 42 is mounted to the robotic arm of second robot 38.

Operation of the first and second stripping apparatus and the first and second robots to strip deposited metal from a cathode plate, remove the stripped cathode plate from the stripping station and move the stripped metal to a transport region or storage region will now be provided with reference to FIGS. 1 to 14. In FIGS. 1 to 14, the robotic arms have been omitted for clarity. However, the person skilled in the art will understand that the robotic arms are used to achieve the required movements of the first and second stripping apparatus. The robotic arms may be programmed with the appropriate sequence of commands to ensure that the required movements occur. Similarly, the control system that controls movement of the robotic arms may also control operation of the clamps on the first stripping apparatus and the second stripping apparatus.

Prior to positioning the cathode plate having the sheets of deposited metal thereon in the stripping station, the cathode plate is flexed to open up a small gap at the top between the deposited sheets of metal and the cathode plate. The stripping apparatus can be inserted into the small gaps in the stripping station in order to complete the stripping process. The step of flexing the cathode plates to partly separate the deposited metal from the cathode plate prior to placing the stripping apparatus between the cathode plate and the deposited sheets of metal is well known in the art and need not be described further.

Figure 1:
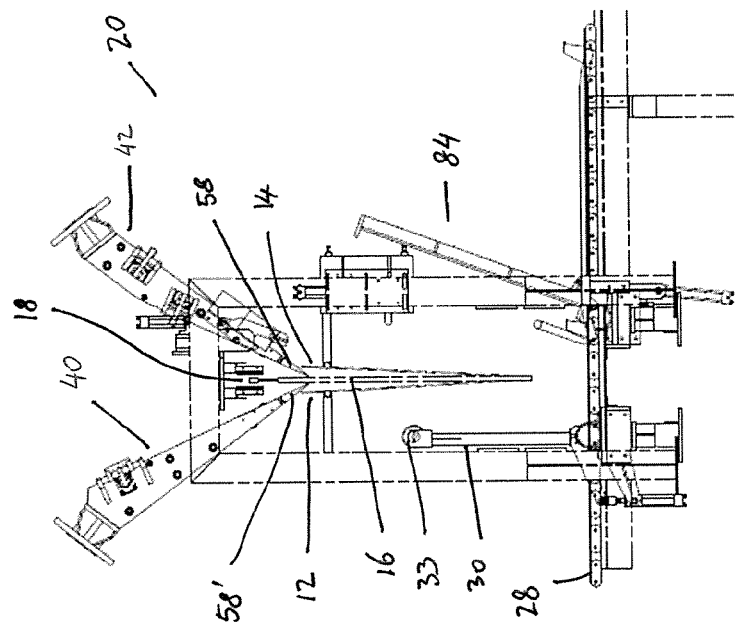

Conventional cathode handling apparatus is used to place the thus-flexed cathode plate in the stripping station 20. This is shown in FIGS. 1 and 2. FIG. 1 shows the cathode plate 16 having the flexed sheets of deposited metal 12, 14 thereon. FIG. 1 also shows the first stripping apparatus 40 being located such that the wedge 58 of first stripping apparatus 40 is positioned into the gap between the sheet of deposited metal 12 and the cathode plate 16. Similarly, second stripping apparatus 42 is positioned such that its wedge 58' is positioned in the gap between sheet of deposited metal 14 and cathode plate 16.

FIGS. 1 and 2 also show a down ender 84. Down ender 84 comprises two spaced frame members 85, 86 that are pivotally mounted at their lower ends about an axle 88. In another alternative, rather than using an axle, the lower ends of frame members 85, 86 may be independently journaled in separate bearings. The bearings are suitably in alignment with each other. An actuator 90, which may be an electric motor having an associated gearing system, can be used to move the down ender 84 from an upright position shown in FIG. 1 to a position at which the upper end of the down ender 84, as shown in FIG. 1, is lowered to a position at which the down ender is located beneath the upper surface of the chain conveyor 28. Operation of the down ender will be described in further detail hereunder.

FIGS. 1 and 2 also shown the pusher 30. As best shown in FIG. 1, the pusher 30 is positioned such that the horizontal contact member 33 is spaced from the deposited sheet of metal 12 at this stage of the stripping cycle.

After the wedges 58, 58' are inserted into the gap between the sheets of deposited metal 12, 14 and the cathode plate 16 (as shown in FIG. 1), the first robot arm and second robot arm simultaneously move the first stripping apparatus 40 and second stripping apparatus 42 downwardly along the cathode plate 16 and the respective sheets of deposited metal 14, 12. As can be seen from FIGS. 1 and 3, first stripping apparatus 40 is located to one side of cathode plate 16 and second stripping apparatus 42 is located to the other side of cathode plate 16.

Figure 4:
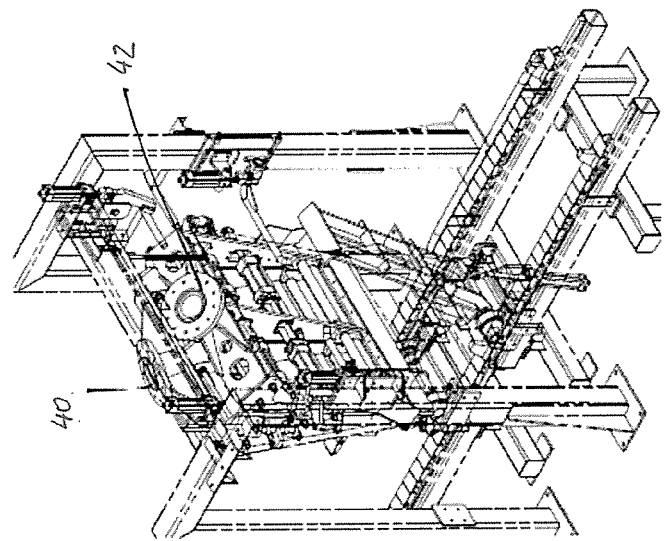
Figure 3:
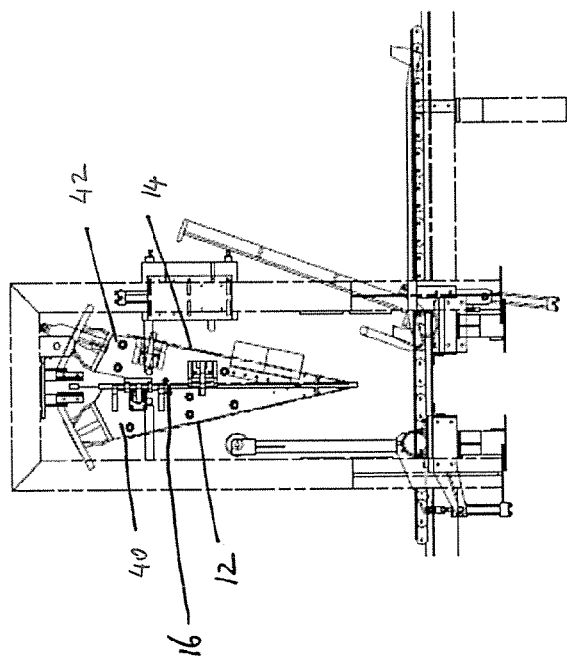
Figure 6:
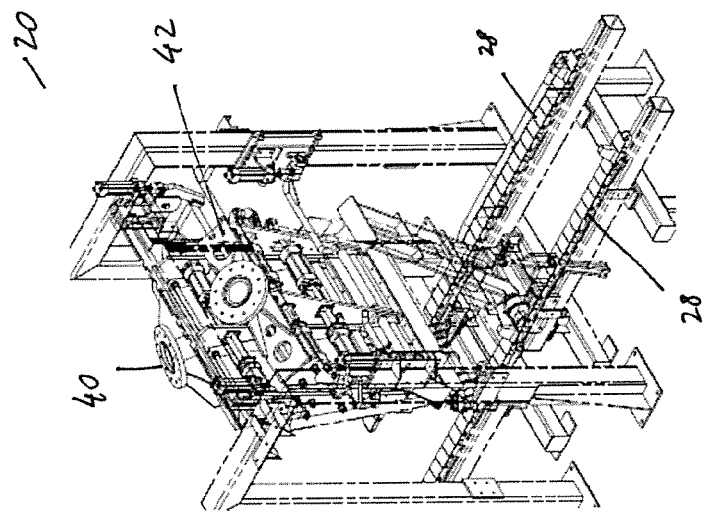

FIGS. 3 and 4 show the first stripping apparatus 40 and the second stripping apparatus 42 located such that the lower ends of the respective stripping apparatus are located adjacent to the lower edge of the cathode plate 16. At this stage, the sheets of deposited metal 14, 16 are still connected to each other along their lower edge but they have been effectively separated from the cathode plate 16. A lifting device (obscured in the drawings), which may form part of the stripping station 20, may also lift the cathode a short distance upwardly (such as around 70 mm) to ensure release of the cathode plate from the deposited metal during the stripping operation.

Figure 5:
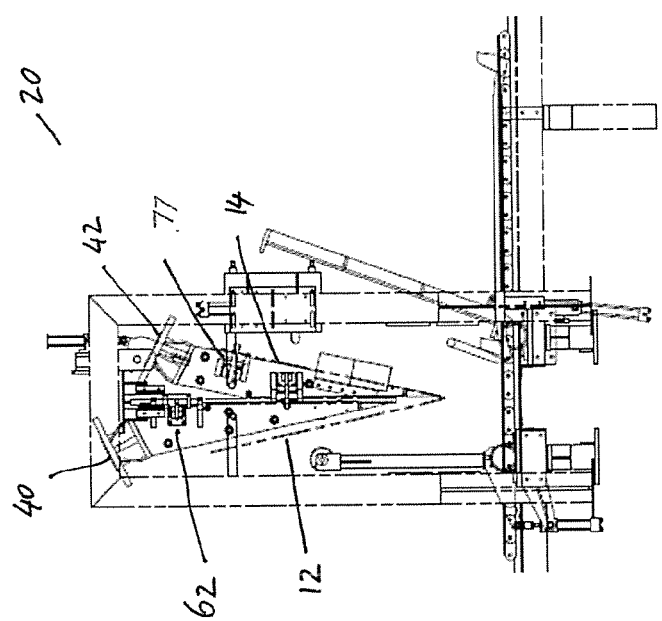

At this stage, the clamps 62, 63 on the first stripping apparatus are actuated to grip the cathode plate 16. Similarly, the clamps 62', 63' on the second stripping apparatus are actuated to clamp onto the sheet of deposited metal 14. The first robot arm is then operated to start to lift the first stripping apparatus 40 upwardly. This also starts to lift the cathode plate 16 out of the stripping station 20. The first step of this movement is shown in FIG. 5. As shown in FIG. 5, the first stripping apparatus 40 has been moved upwardly by a small distance such that there is now a small gap between the sheet of metal 12 and the first stripping apparatus 40. As the second sheet of deposited metal 14 is being gripped by the clamps 62', 63' on the second stripping apparatus 42, the second sheet of metal 14 and the attached sheet of metal 12 remain in position.

Figure 8:
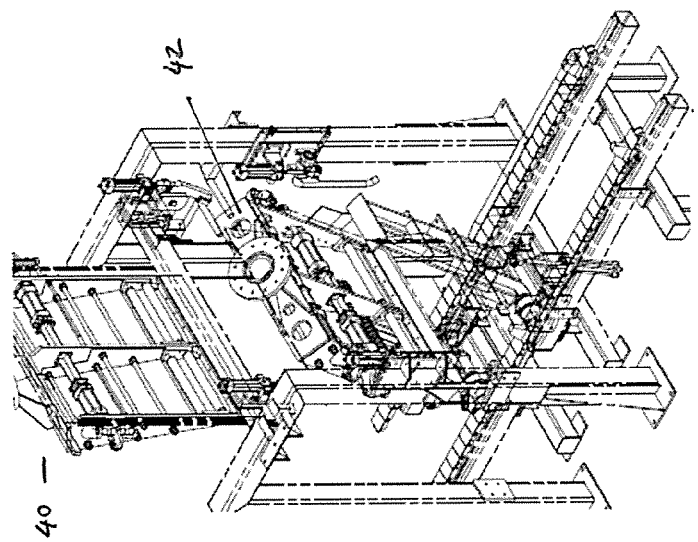
Figure 7:
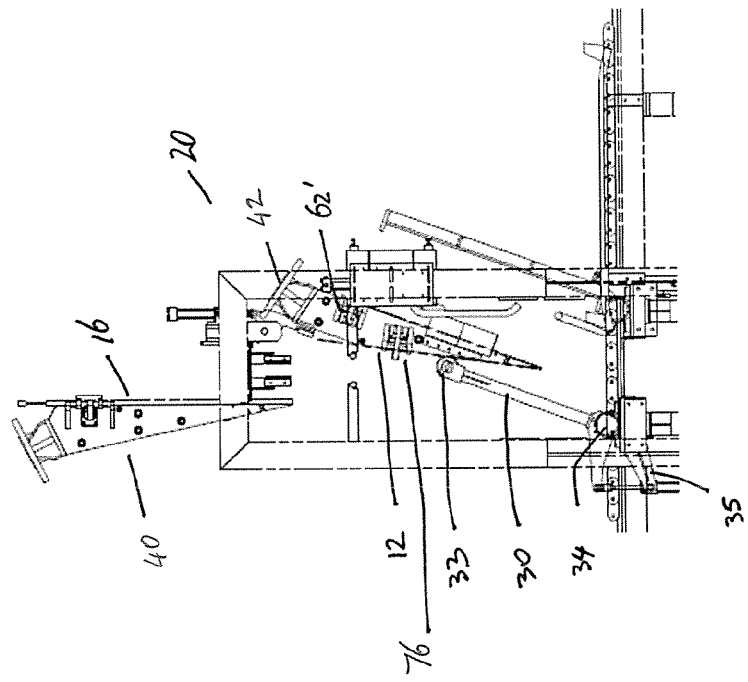

FIGS. 7 and 8 show the first stripping apparatus 40 continuing to be raised upwardly by the first robot arm, which effectively removes the cathode plate 16 out of the stripping station 20. The pusher 30 is actuated such that the horizontal contact member 33 comes into contact with the sheet of metal 12 and pusher the sheet of metal 12 towards the second stripping apparatus 42. Clamps 76, 77 are then actuated to grip the other sheet of metal 12. In this manner, both sheets of metal 12, 14 are gripped by the clamps or grippers that are mounted on the second stripping apparatus 42.

Figure 10:
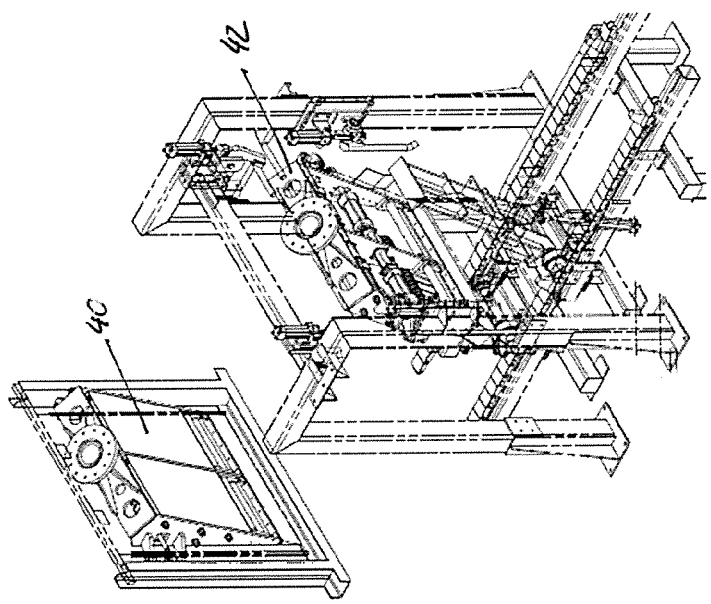
Figure 9:
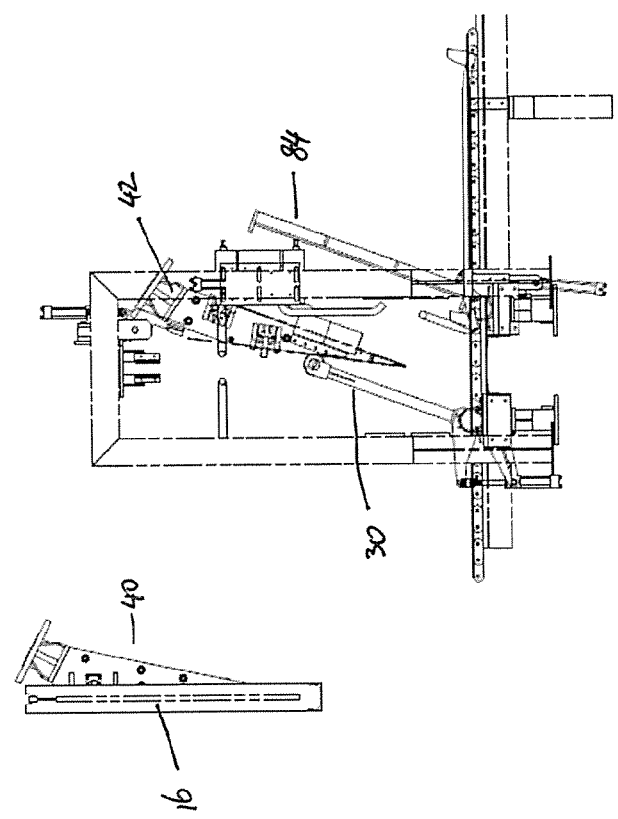

In FIGS. 9 and 10, the first stripping apparatus 40 has been moved by the first robot to a cathode plate transport or storage region. At this stage, the clamps 62, 63 on the first stripping apparatus 40 may be operated such that they release the cathode plate 16. The cathode plate 16 is then either stored or moved as required. Typically, the cathode plate 16 will be placed in storage until it is required for re-use in the electrodeposition plant or the electrowinning plant.

Figure 12:
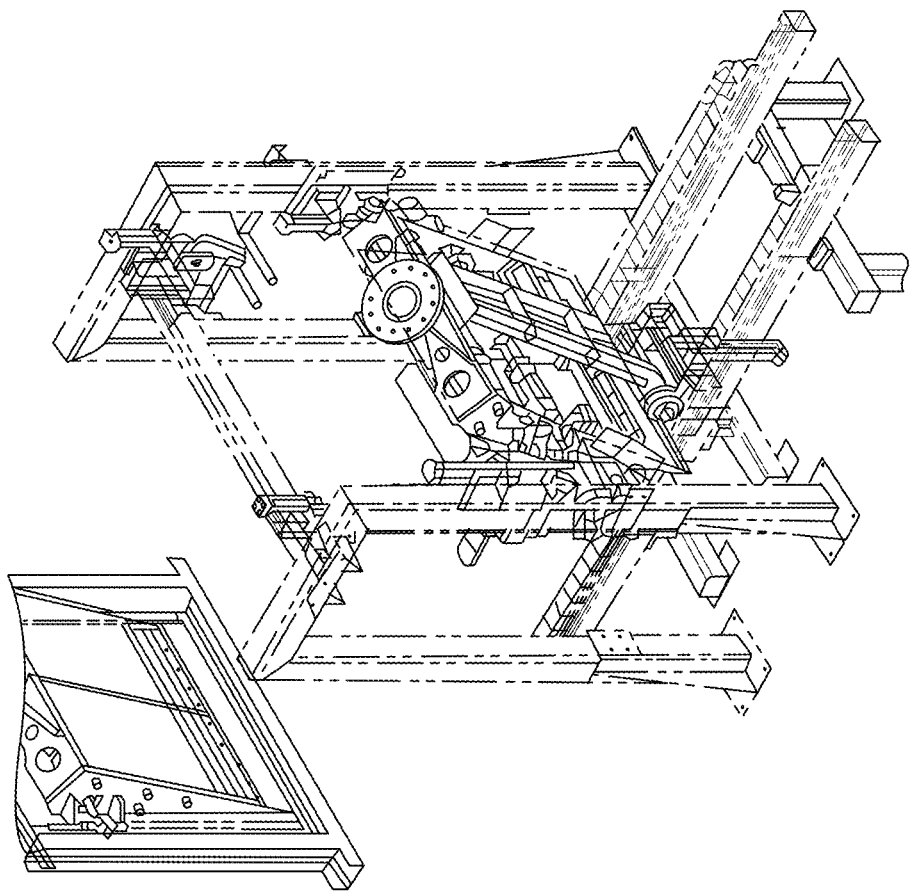
Figure 11:
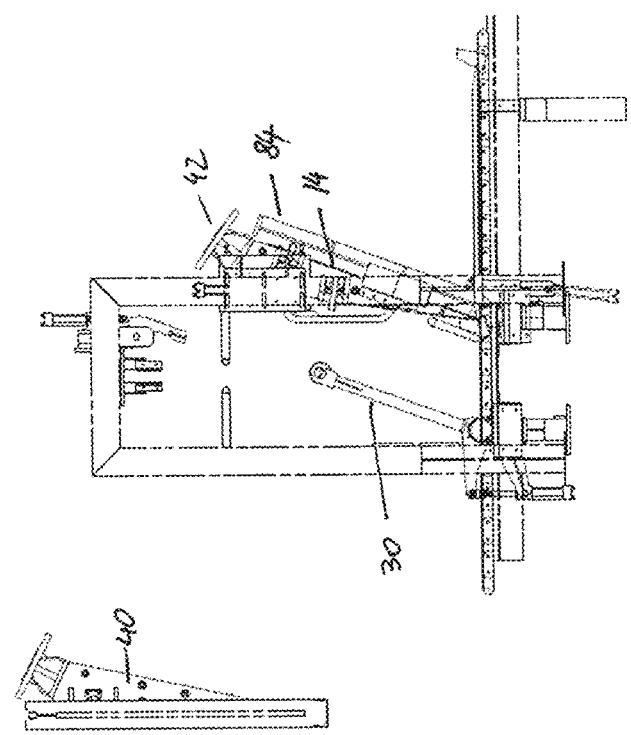

FIGS. 11 and 12 show the second stripping apparatus 42 being moved by the second robot arm so that the sheet of deposited metal 14 is brought into contact or abutment with the down ender 84. The clamps 76, 77, and 62', 63' are then operated to release the respective cathode sheets/sheet of deposited metal 14 and 12. The second robot arm is then operated to lift the second stripping apparatus 42 upwardly and away from the sheets of deposited metal 12, 14 such that the sheets of deposited metal 12, 14 remain resting on the down ender 84. It will be appreciated that the step shown in FIGS. 11 and 12 can commence as soon as the bottom part of first stripping apparatus 40 has been raised clear of the upper end of sheet of deposited metal 12. In other words, the step shown in FIGS. 11 and 12 can take place as soon as the first stripping apparatus 40 reaches the position as shown in FIGS. 7 and 8.

Figure 14:
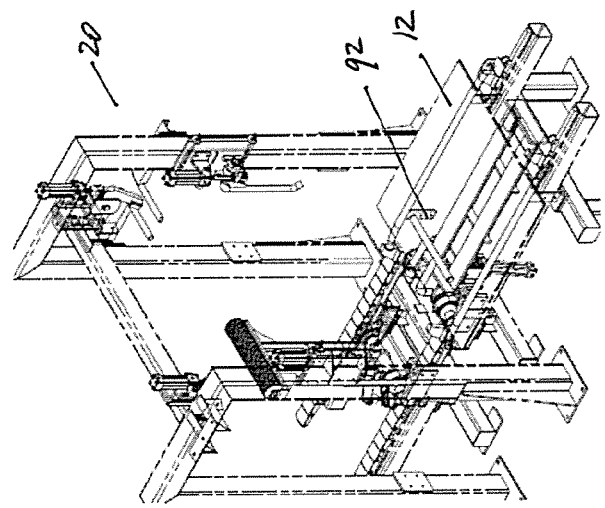
Figure 13:
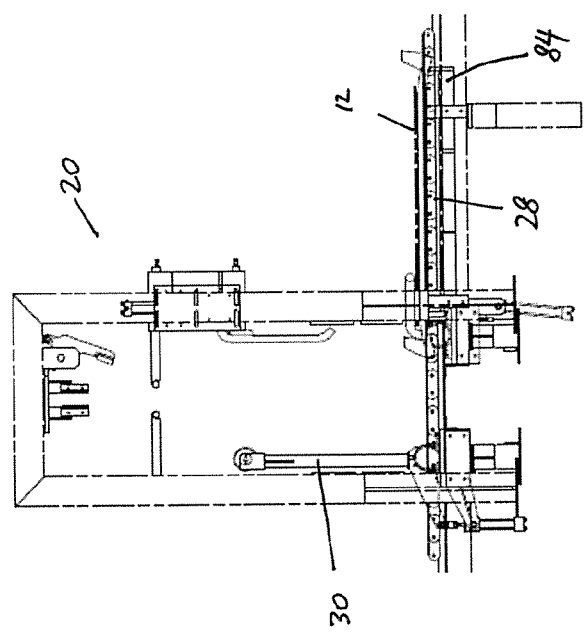

Once the second stripping apparatus 42 has been removed from between the sheets of deposited metal 12 and 14, the down ender 84 is lowered to the position shown in FIGS. 13 and 14. Following withdrawal of the second stripping apparatus 42 from between the sheets of deposited 12 and 14, but whilst the down ender 84 was still in the position shown in FIG. 11, the pusher 30 may be further operated to push the sheet of deposited metal 12 closer to the sheet of deposited metal 14, which closes up to gap at the upper ends of the sheets of deposited metal 12, 14. This may be an optional step. In some embodiments, the down ender rotates sufficiently far so that the back end 92 of the down ender 84 (see FIG. 14) contacts and pushes the metal stripped by the first robot up against the metal stripped by the second robot so that the sheets of deposited metal of brought close together in the horizontal position on the conveyor.

When the down ender 84 reaches the position as shown in FIG. 13, the down ender 84 is located below the upper surface of the chain conveyor 28. However, as the sheets of metal 12, 14 are wider than the distance between the adjacent chains of the chain conveyor 28, the sheet of deposited metal 14 comes into contact with the chains of the chain conveyor 28. These chains desirably start to operate when a pair of sheets of deposited metal 12, 14 are received and move along with the chain conveyor after down ender 84 reaches the position shown in FIGS. 13 and 14. This removes the sheets of deposited metal 12, 14 from the stripping station 20 and clears them from the down ender. In one embodiment, the conveyor has driving dogs and the chains start and travel a fixed distance every time a pair of cathode deposits are received. The conveyor maybe of conventional design and operation.

In order to ready the stripping station 20 for stripping deposited metal from another cathode plate, the pusher 30 is returned to a more upright orientation (as shown in FIG. 13) and the down ender 84 is raised back to the position shown in FIG. 1. The next cathode plate with deposited metal thereon can then be placed in the stripping station 20, and the sequence of operations can be repeated.

Preferred embodiments of the present invention allow for efficient handling of cathode plates and the stripped metal that has been removed from the cathode plates. This can result in improved productivity and increased metal production from the stripping stations. Further, as the cathode plates are removed from the stripping stations by one of the robots, separate cathode plate handing apparatus for removing the stripped cathode plates from the stripping station is not required.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for stripping metal deposited on a cathode plate, wherein the cathode plate has a first sheet of metal deposited on a first side and a second sheet of metal deposited on a second side, with a bridge of metal formed at a lower edge of the cathode plate interconnecting the first sheet of metal with the second sheet of metal, the method comprising:
   moving a first stripping apparatus with a first robotic arm to separate the first sheet of metal from the first side of the cathode plate,
   moving a second stripping apparatus with a second robotic arm to separate the second sheet of metal from the second side of the cathode plate, wherein the first sheet of metal and second sheet of metal remain interconnected by the bridge of metal at the lower edge,
   gripping the cathode plate with a first gripping apparatus, the first gripping apparatus being associated with the first robotic arm, and operating the first robotic arm to remove the cathode plate from the stripping station and place the cathode plate into a storage region or a transport region, and
   gripping one or both of the first sheet of metal and second sheet of metal using a second gripping apparatus associated with the second robotic arm, and operating the second robotic arm to move the first sheet of metal and the second sheet of metal to a metal storage region or a metal transport region.

2. The method as claimed in claim 1 wherein the second sheet of metal is held in position by side guides and a pusher pushes the first sheet of metal towards the stripping apparatus, and a second gripping apparatus associated with the second robotic arm grips the first sheet of metal and/or the second sheet of metal and the second robotic arm is operated to move the first sheet of metal and the second sheet of metal to the metal storage region or metal transport region.

3. The method as claimed in claim 2 wherein the second sheet of metal is gripped by second gripping apparatus associated with the second robotic arm and a pusher pushes the first sheet of metal towards the stripping apparatus to close up a gap between the first sheet of metal and the second sheet of metal, and the second robotic arm is operated to move the first sheet of metal and the second sheet of metal to the metal storage region or metal transport region.

4. The method as claimed in claim 3 wherein the second gripping apparatus grips the first sheet of metal once it has been pushed towards the second sheet of metal.

5. The method as claimed in claim 1 wherein the second robotic arm moves the first sheet of metal and the second sheet of metal to a movable support and the second gripping apparatus is actuated to let go of the first sheet of metal and the second sheet of metal, and the movable support is moved so that the first sheet of metal and the second sheet of metal are moved onto a conveyor.

6. The method as claimed in claim 5 wherein the movable support comprises a down ender having a support surface, the support surface being movable between a lower position at which the support surface at least partly located below a conveyor and an upper position at which the support surface extends upwardly above the conveyor, wherein the first metal sheet and the second metal sheet are moved by the second robotic arm to a position where first metal sheet and the second metal sheet are supported by the support surface in the upper position, the second gripping apparatus releases the metal sheets and the second robotic arm is operated to move the second gripping apparatus away from the metal sheets, and the down ender is operated so that the support surface moves to the lower position and the metal sheets come into contact with the conveyor and are transported away by the conveyor.

7. The method as claimed in claim 1 wherein the steps of separating the first sheet of metal and the second sheet of metal from the respective sides of the cathode plate comprises positioning a first stripping apparatus between the cathode plate and the first sheet of metal, positioning a second stripping apparatus between the cathode plate and second sheet of metal, the first stripping apparatus being moved by the first robotic arm and the second stripping apparatus being moved by the second robotic arm, moving the first stripping apparatus between the first sheet of metal and the cathode plate to thereby separate the first sheet of metal from the cathode plate and moving the second stripping apparatus between the second sheet of metal and the cathode plate to thereby separate the second sheet of metal from the cathode plate, wherein the first sheet of metal and second sheet of metal remain interconnected by the bridge of metal at the lower edge.

8. The method as claimed in claim 1 wherein the cathode plates have been flexed prior to positioning in the stripping station to open up a small gap at the top between the deposited sheets of metal and the cathode plate and the stripping apparatus is subsequently inserted into the small gaps in the stripping station in order to complete the stripping process.

9. An apparatus for stripping metal deposited on a cathode plate, the apparatus comprising:
   a stripping station having a support for supporting a cathode plate having a first sheet of metal deposited on a first side of the cathode plate and a second sheet of metal deposited on a second side of the cathode plate, the first sheet of metal and the second sheet of metal being interconnected by a bridge of metal deposited at a lower edge of the cathode plate;

a first stripping machine located on a first side of the cathode plate, the first stripping machine comprising a first robotic arm carrying a first stripping apparatus, the first stripping machine having a first gripping apparatus associated with the first robotic arm, the first gripping apparatus adapted to grip the cathode plate such that the first robotic arm can be operated to thereby lift the cathode plate out of the stripping station following stripping of the first metal sheet and the second metal sheet from the cathode plate;

a second stripping machine located on a second side of the cathode plate, the second stripping machine comprising a second robotic arm carrying a second stripping apparatus, the second stripping machine having a second gripping apparatus associated with the second robotic arm, the second gripping apparatus adapted for gripping one or both of the first sheet of metal and the second sheet of metal, wherein the second robotic arm can be operated to move the first sheet of metal and the second sheet of metal to a metal storage region or a metal transport region following stripping of the first sheet of metal and second sheet of metal from the cathode plate; and the first stripping apparatus and the second stripping apparatus being operable to strip the first sheet of metal and the second sheet of metal from the cathode plate without breaking the bridge of metal that interconnects the first sheet of metal and the second sheet of metal.

10. The apparatus as claimed in claim 9 wherein the first stripping apparatus is connected to the first robotic arm and the second stripping apparatus is connected to the second robotic arm.

11. The apparatus as claimed in claim 10 wherein the first stripping apparatus is mounted directly to the first robotic arm and the second stripping apparatus is mounted directly to the second robotic arm, or the first stripping apparatus is mounted indirectly with one or more intermediate portions between the first robotic arm and the first stripping apparatus and the second stripping apparatus is mounted indirectly with one or more intermediate portions between the second robotic arm and the second stripping apparatus.

12. The apparatus as claimed in claim 9 wherein the stripping apparatus includes one or more insertion means adapted for insertion between the metal and the cathode plate in order to separate at least a portion of the metal from the cathode plate.

13. The apparatus as claimed in claim 12 wherein the insertion means comprises one or more pincers, knives, chisels, wedges or the like, or any combination thereof.

14. The apparatus as claimed in claim 12 further comprising complementary means adapted to be positioned adjacent the external surface of the metal such that the insertion means and the complementary means form a pair of pincers adapted to grip at least a portion of the metal.

15. The apparatus as claimed in claim 12 comprising a plurality if insertion means, the insertion means being spaced apart from one another such that the insertion means are inserted into a gap between the metal and the cathode plate at points along at least a portion of the width of the cathode plate in order to ensure that the entire width of the metal is separated from the cathode plate.

16. The apparatus as claimed in claim 9 wherein the stripping apparatus comprises stripping means and the shape of the stripping means is such that driving the stripping means between the metal and the cathode plate is sufficient to result in the stripping of the metal from the cathode plate.

17. The apparatus as claimed in claim 16 wherein the stripping means comprises a wedge-shaped portion, wherein the wedge-shaped portion is driven point-first between the metal and the cathode plate.

18. The apparatus as claimed in claim 17 wherein a tip of the wedge-shaped portion is driven to the bottom of the cathode plate during stripping.

19. The apparatus as claimed in claim 17 wherein the dimensions of the wedge-shaped portion are such that an angle between the metal sheet and the cathode plate is no more than 20°, or no more than 15°, or between about 10° and 12° when the wedge-shaped portion is driven to the bottom of the cathode plate.

20. The apparatus as claimed in claim 19 wherein an angle between the sides of the wedge-shaped portion is no more than 20°, or no more than 15°, or between about 10° and 12°.

21. The apparatus as claimed in claim 17 wherein the dimensions of the wedge-shaped portion are such that the height of the wedge-shaped portion is approximately equal to the height of the metal sheet and the width of the wedge-shaped portion is approximately equal to the width of the cathode plate.

22. The apparatus as claimed in claim 17 wherein a plurality of wedge-shaped portions is provided.

23. The apparatus as claimed in claim 22 wherein the wedge-shaped portions are spaced approximately equidistantly from one another across the width of the cathode plate.

24. The apparatus as claimed in claim 9 wherein the stripping means are provided with one or more rollers to reduce friction as the stripping means is driven into the gap between the metal and the cathode plate.

25. The apparatus as claimed in claim 24 wherein the stripping means comprises a pair of rollers, with one of said pair of rollers being adapted to contact the internal face of the metal, while the second of said pair of rollers is adapted to contact the surface of the cathode plate.

26. The apparatus as claimed in claim 24 wherein the one or more rollers are adapted to be located at or adjacent a vertical edge of the metal when the apparatus is in use.

27. The apparatus as claimed in claim 26 wherein one or more rollers are adapted to be located at each of the vertical edges of the metal and the wedge-shaped portion is located intermediate the one or more rollers adapted to be located at each of the vertical edges of the metal.

28. The apparatus as claimed in claim 9 wherein the stripping means comprises at least one roller that contacts the cathode plate and at least one projection that contacts the metal.

29. The apparatus as claimed in claim 28 wherein the at least one roller contacts the cathode plate, thereby minimising damage to the cathode plate.

30. The apparatus as claimed in claim 9 wherein each robotic arm comprises a first arm having a second arm pivotally connected thereto, the stripping apparatus being pivotally connected to the second arm of the robotic arm, the first arm of the robotic arm being pivotally connected to a base, the base being rotatable about a vertical axis, the first robotic arm being pivotally connected about a horizontal axis to the base, the second arm being pivotally connected to the first arm.

31. The apparatus as claimed in claim 9 wherein the first robotic arm and the second robotic arm are controlled such that the first stripping apparatus and the second stripping apparatus move simultaneously with each other during stripping of the sheets of metal from the cathode plate.

32. The apparatus as claimed in claim 9 wherein the stripping means is formed integrally with the robotic arm, or the robotic arm is adapted to allow the stripping means to be attached thereto.

33. The apparatus as claimed in claim 9 wherein the first gripping apparatus comprises one or more clamps, suction devices, clips or any combination thereof and the second gripping apparatus comprises one or more clamps, suction devices, clips or any combination thereof.

34. The apparatus as claimed in claim 33 wherein the first gripping apparatus comprises one or more clamps and the one or more clamps are actuated electrically, hydraulically, pneumatically, or any combination thereof and the second gripping apparatus comprises one or more clamps and the one or more clamps are actuated electrically, hydraulically, pneumatically, or any combination thereof.

35. The apparatus as claimed in claim 9 wherein the first gripping apparatus comprises at least one clamp located at one side of the first stripping apparatus and at least one clamp located at an opposite side of the first stripping apparatus and the second gripping apparatus comprises at least one clamp located at one side of the second stripping apparatus and at least one clamp located at an opposite side of the second stripping apparatus.

36. The apparatus as claimed in claim 9 wherein the first gripping apparatus is mounted to a frame or a support that forms part of the first stripping apparatus and the second gripping apparatus is mounted to a frame or a support that forms part of the second stripping apparatus.

\* \* \* \* \*